United States Patent [19]

Geake

[11] Patent Number: 4,906,105

[45] Date of Patent: Mar. 6, 1990

[54] MEASUREMENT OF THERMAL CONDITIONS

[75] Inventor: John E. Geake, Manchester, England

[73] Assignee: United Biscuits (UK) Limited, Middlesex, England

[21] Appl. No.: 207,893

[22] Filed: Jun. 14, 1988

Related U.S. Application Data

[63] Continuation of Ser. No. 933,002, Nov. 20, 1986, abandoned.

[30] Foreign Application Priority Data

Nov. 20, 1985 [GB] United Kingdom ............... 8528517

[51] Int. Cl.$^4$ .................. G01J 5/12; G01K 17/20; G01N 25/20
[52] U.S. Cl. .................................. 374/30; 165/32; 250/341; 374/32; 374/121
[58] Field of Search .................... 374/30, 29, 10, 12, 374/165, 31; 250/342, 341, 345

[56] References Cited

U.S. PATENT DOCUMENTS

| | | | |
|---|---|---|---|
| 933,543 | 9/1909 | Foster | 374/121 X |
| 2,938,122 | 5/1960 | Cole | 374/32 X |
| 3,069,546 | 12/1962 | Buntenbach | 250/342 |
| 3,123,996 | 3/1964 | Musial | 374/29 |
| 3,232,113 | 2/1966 | Malone | 374/30 |
| 3,255,632 | 6/1966 | Brooks | 250/352 X |
| 3,355,589 | 11/1967 | Clifford | 374/121 X |
| 3,417,617 | 12/1968 | Rall | 374/165 |
| 3,596,514 | 8/1971 | Mefferd et al. | 73/190 |
| 4,085,613 | 4/1978 | Richard | 73/193 R X |
| 4,117,712 | 10/1978 | Hager, Jr. | 374/9 |
| 4,123,938 | 11/1978 | Hamilton | 374/29 |
| 4,522,511 | 6/1985 | Zimmerer | 374/32 |
| 4,555,764 | 11/1985 | Kuehn | 374/30 X |

FOREIGN PATENT DOCUMENTS

| | | |
|---|---|---|
| 0030773 | 6/1981 | European Pat. Off. . |
| 35027 | 4/1981 | Japan .................................. 374/32 |
| 0986031 | 3/1965 | United Kingdom . |
| 1319865 | 6/1973 | United Kingdom . |
| 2084742 | 4/1982 | United Kingdom . |
| 2032109B | 10/1982 | United Kingdom . |

OTHER PUBLICATIONS (DTA) (Thermalanalysis) Dupont Rev. 6-63, pp. 3-4.

Primary Examiner—Daniel M. Yasich
Attorney, Agent, or Firm—Seidel, Gonda, Lavorgna & Monaco

[57] ABSTRACT

Thermal conditions inside an oven are measured by a transducer device (1) having plates providing heat absorbent and heat reflective surfaces (2,4) and a thermocouple for measuring the temperature difference between them as a measure of radiant heat. The plates are mounted on a thin thermally insulating layer secured to a heat sink in the form of a copper mass (7,9), and a second thermocouple measures the temperature difference between the heat absorbent surface and the heat sink as a measure of heat flux through the surface. A Peltier cooler (55) or a flowing liquid can be used alternatively as a heat sink. Heat flux alone can be measured by omission of the heat reflective surface, and where the heat sink is a flowing fluid the heat gained can be measured.

21 Claims, 2 Drawing Sheets

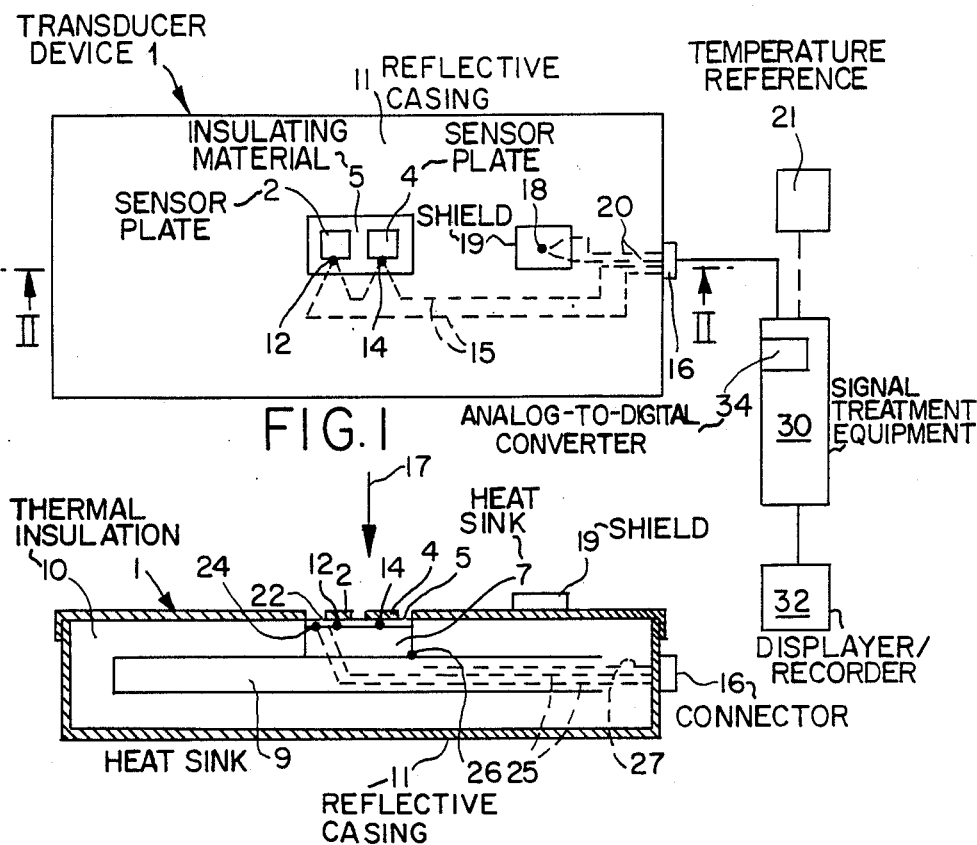
FIG. 1
FIG. 2
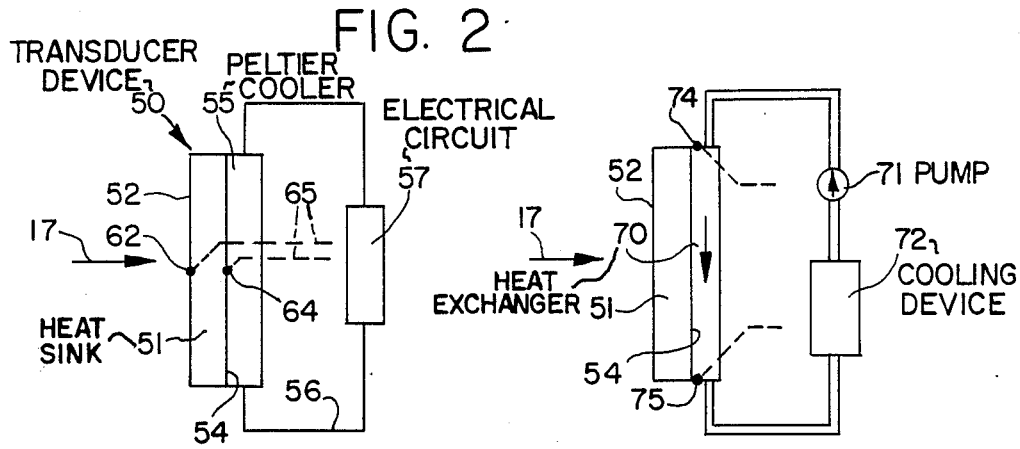
FIG. 3
FIG. 4

MEASUREMENT OF THERMAL CONDITIONS

This is a continuation of co-pending application Ser. No. 933,002 filed on Nov. 20, 1986 now abandoned.

FIELD OF THE INVENTION

This invention relates to the measurement of thermal conditions, in particular of thermal conditions within a chamber, for example, a baking oven for biscuits.

BACKGROUND OF THE INVENTION

In connection with the control and operation of ovens, for example, baking ovens in which biscuit baking is carried out on a commercial scale, it is important to have accurate information as to the thermal conditions within the oven as baking is effected. In conveyor ovens, biscuits to be baked are carried through the oven, the interior of which is heated by a series of heat sources, and it is desirable to monitor the thermal experience of the biscuits, due to convection and to radiant heat from the burners and from the oven walls, as they progress along the conveyor path.

It is accordingly an object of the invention to provide simple and effective apparatus for measuring thermal parameters such as radiation and heat flux to enable this to be done.

It is also an object of the invention to provide a transducer device capable of providing information about both radiant heat and heat flux from a thermal environment.

It is a further object of the invention to provide a transducer device capable of being carried through a conveyor oven and providing information about varying thermal conditions therein.

SUMMARY OF THE INVENTION

The invention provides a method of and an apparatus for measuring a thermal environment by measurement of temperature differences between a heat absorbent surface exposed to the thermal environment and a reference surface, the reference surface being either a heat reflective surface likewise exposed to the thermal environment, or a second surface of a body providing the heat absorbent surface, the second surface being maintained at a constant temperature or at a measured variable temperature by a heat sink.

The heat sink may be an active heat sink, for example, a Peltier cooler or a flowing fluid in heat exchange relationship with the second surface, or a passive sink into which heat is allowed to flow with a consequential relatively slow increase in its temperature, for example, a block of copper or other suitable material. Such a passive sink is convenient for a movable transducer device of the apparatus, for example, a device designed to travel on a conveyor through a baking oven, as compared to a fixed transducer device, to which electrical and/or fluid supplies can be more readily effected.

The temperature difference between the heat absorbent and the heat reflective surfaces is a measure of radiant heat, and the temperature difference between the exposed and the second surface is a measure of the total heat flux through the exposed surface, due to both radiant and convective heat. Both measures can be usefully employed in some applications, so the heat absorbent surface can be provided by a body providing also the second surface in thermal communication with the heat sink.

In a further aspect, the invention provides a method of and apparatus for measuring a thermal environment in which a surface of a body of thermally conductive material is exposed to the environment, and a second surface of the body is in heat-transfer relationship with a flowing fluid, the temperature of the fluid before and after contact with the second surface being measured and the heat flux calculated from the temperature difference and the properties of the fluid.

The exposed or heat absorbent surface may be blackened and the reflective surface may be polished. The exposed and second surfaces may conveniently be constituted by the opposed sides of a metal plate to ensure good heat flow between them but where a passive heat sink is employed, it is advantageous to use a very thin plate, thus a plate of low thermal capacity and to inhibit heat flow to the sink by a thin layer of insulating material, to retard heat flow into the sink to avoid a quick rise in its temperature.

The each temperature difference is conveniently sensed by a thermocouple, the output of which is advantageously digitized for convenient treatment in a computer supplying desired outputs to recording and/or display equipment.

By means of the method and apparatus of the invention it becomes possible to measure, as for control purposes, steady or changing temperature conditions within an oven or other thermal environment, in particular the thermal conditions along and also transversely of a conveyor path within an oven, in a simple and effective way.

BRIEF DESCRIPTION OF THE DRAWINGS

FIG. 1 is a schematic plan view of an illustrative apparatus in accordance with the invention;

FIG. 2 is a cross-sectional view through a transducer device of the apparatus of FIG. 1, taken on line II—II thereof;

FIG. 3 is a schematic side view of a second transducer device in accordance with the invention;

FIG. 4 is a like view of a modified form of the second device.

Figure 5:
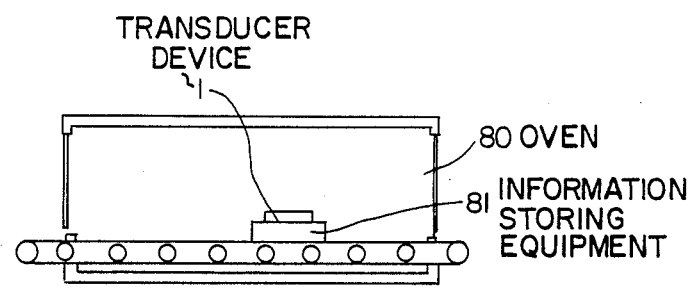
FIG. 5 is a schematic sectional side view of a heated chamber in the form of a conveyor oven having the apparatus of FIGS. 1 and 2 therein.

The apparatus shown in FIG. 1 includes a transducer device 1 comprising two sensor plates 2 and 4, conveniently square or circular in shape, which are secured in place on a layer 5 of insulating material of rectangular shape, the plates being spaced from the edges of the layer and from each other. The plates 2 and 4 are lapped to the layer 5 to ensure good thermal contact and secured by adhesive.

The insulating layer 5 is attached to a major surface of a rectangular block 7 of copper, which is in turn centrally secured to a larger rectangular copper block 9 of substantially the same thickness but of greater area. A layer of thermal insulation 10 surrounds the copper blocks 7 and 9 except for the surface of the smaller block to which the insulating layer 5 is connected. This assembly is encased in a highly reflective casing, for example, a rectangular aluminium box 11 provided with an aperture at its major face through which the insulating layer 5 and the sensor plates 2 and 4 are exposed.

The sensor plates are conveniently thin brass plates and the exposed face of the plate 2 is blackened, as by carbon black, so as to be highly heat energy absorbent, and the exposed surface of the plate 4 is polished, after being plated if desired, so as to be reflective. The two surfaces may be covered by a thin heat resistant plastics layer as a protection against corrosion if appropriate.

Thermocouple junctions 12 and 14 are attached to the blackened plate 2 and to the polished plate 4 respectively and leads 15 extend from these junctions to an output connector 16 for the transducer device. When the plates 2 and 4 are exposed to radiation as indicated by arrow 17, the temperature of plate 2 will rise because of its heat absorbing surface more rapidly than that of the plate 4 with its reflective surface. The temperature difference registered by the thermocouple comprising the junctions 12 and 14 is a measure of the radiation flux due to the radiation.

The illustrated transducer device also has a probe or sensor for measuring ambient air temperature closely adjacent the plates 2 and 4, in the form of a thermocouple junction 18 shielded by a suitable shield 19 so that only ambient air temperature is sensed. Leads 20 connect the junction 18 with the connector 16, and the other junction co-operating with the junction 18 is held at a constant reference temperature at 21 externally of the transducer device.

The device 1 additionally has thermocouple junctions 22,24 positioned respectively on the blackened plate 2 and on the heat sink represented by the copper blocks 7,9 and connected by leads 25 to the connector 16. The temperature difference sensed by the thermocouple comprising these junctions 22,24 measures the total heat flux experienced by the blackened plate 2, due to both radiation and convection, in consequence of the thermal environment to which it is exposed.

The heat sink represented by the copper blocks 7,9 will rise in temperature as heat flows into it through the plate 2. The heat sink temperature is accordingly measured also by means of a further thermocouple junction 26 located on the block 7 and connected by lead 27 to the connector 16. The other junction of this third thermocouple is also held at the constant reference temperature at 21.

In use, the transducer device 1 is connected by way of the connector 16 to signal treatment equipment 30 and may be placed at a static position within an oven or other heated chamber, or it may be carried on a conveyor through a conveyor oven 80, as shown in FIG. 5, the connection then being effected by a trailing cable.

The four thermocouple outputs can be treated in any convenient way in the equipment 30 prior to being displayed and/or recorded at a station 32. For example, the thermocouple outputs can each be connected to a high quality low drift chopper amplifier and the outputs recorded on a 3-pen recorder. Preferably however, the equipment 30 comprises a digital computer and the outputs are digitized by analog-to-digital converters 34 included in the equipment, prior to being analysed to provide the required information for recording and/or display at the station 32.

Where the transducer device 1 is to be moved through the conveyor oven, the thermocouple outputs can be transferred to the oven exterior by telemetry instead of by a trailing cable, or they can be stored, conveniently after being digitized, in equipment 81 carried through the oven with the device 1, shown in FIG. 5.

The transducer 1 can be modified to measure heat flux only by omission of the plate 4 and the thermocouple junctions 12,14 whilst the alternative transducers of FIGS. 3 and 4, which measure total heat flux only, could be modified to measure also radiant heat by the addition of a heat reflective surface and an appropriate additional temperature sensor.

The alternative transducer device 50 shown in FIG. 3 comprises a block or plate 51 of heat conductive material having a first face 52 which is exposed to the radiation 17 and convection of a thermal environment. The opposed face 54 of the plate 51 is in good thermal contact with a Peltier cooler 55 connected by electrical leads 56 to an appropriate electrical circuit 57. The faces 52 and 54 of the block 51 are fitted with respective thermocouple junctions 62 and 64 from which leads 65 extend to an appropriate connector or directly to equipment 30 and 32 such as has been described in connection with FIGS. 1 and 2.

When the surface 52 is exposed to heat, the temperature of the block 51 rises and heat is conducted through it to the surface 54. This surface is maintained at a substantially constant temperature by the Peltier cooler 55 under control of the equipment 30. The temperature difference between the surfaces 52 and 54 is measured by means of the thermocouple comprising the junctions 62 and 64 and from this difference and from the thickness and the thermal conduction properties of the block 51, the thermal conditions to which the surface 52 is exposed can be determined.

In the modified form of the transducer device 50 shown in FIG. 4, the Peltier cooler 55 is replaced by a heat exchange device comprising a chamber 70 in good thermal contact with the face 54 of the block 51. Water or other suitable fluid is made to flow through the chamber 70 by being circulated in a system comprising a pump 71, a cooling device 72, and ducting 73, again under control of the equipment 30. The cooling fluid continuously extracts heat from the block 51 so as to maintain the surface 54 of the body at a substantially constant temperature. The heat flow through the block 51 is in this instance measured in terms of the temperature rise experienced by the cooling fluid in traversing the surface 54, by a thermocouple having junctions 74 and 75 located at the inlet and outlet respectively of the chamber.

It is evident that those skilled in the art may make numerous modifications of the specific embodiment described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

I claim:

1. Apparatus for measurement of radiation flux within a heated chamber, said apparatus comprising a transducer having:
   a first thin plate having a heat energy absorbent surface,
   a second thin plate having a heat energy reflective surface,
   a thin insulating layer, said thin insulating layer having said first and second plates mounted in adjacency thereon with said absorbent and reflective surfaces exposed,
   a heat sink member, said heat sink member having said thin insulating layer mounted thereon with said absorbent and reflective surfaces exposed, whereby said first and second plates are in thermal contact with said heat sink member by way of the surfaces thereof opposite said absorbent and reflective surfaces and said thin insulating layer, a reflective casing enclosing said heat sink member except in the region of said thin insulating layer, and sensor means adapted to measure a temperature difference between said first and said second plates as a measure of the radiation flux incident on said plates, said sensor means comprising two thermocouple junctions, said junctions being attached to said first and said second plates respectively in a thermally conductive relationship with said first and second plates.

2. The apparatus of claim 1 further comprising an output connector on said casing, leads connecting said thermocouple junctions to said connector, and measurement display equipment, whereby said measurements can be remotely displayed on said equipment by connection thereof to said transducer by way of said connector.

3. Apparatus for measurement of radiation flux within a heated chamber, said apparatus comprising a transducer having:

a first thin plate having a heat energy absorbent surface, a second thin plate having a heat energy reflective surface, a thin insulating layer, said thin insulating layer having said first and second plates mounted in adjacency thereon with said absorbent and reflective surfaces exposed, a heat sink member, said heat sink member having said thin insulting layer mounted thereon with said absorbent and reflective surfaces exposed, whereby said first and second plates are in thermal contact with said heat sink member by way of the surfaces thereof opposite said absorbent and reflective surfaces and said thin insulating layer, a reflective casing enclosing said heat sink member except in the region of said thin insulating layer, sensor means adapted to measure a temperature difference between said first and second plates as a measure of the radiation flux incident on said plates, said sensor means comprising two thermocouple junctions attached to said first and second plates respectively, a first thermocouple junction mounted externally of said reflective casing, a second thermocouple junction, and means maintaining said second thermocouple junction at a reference temperature, said first and second thermocouple junctions cooperating to measure temperature ambient to said casing.

4. Apparatus for measurement of radiation flux within a heated chamber, said apparatus comprising a transducer having:

a first thin plate having a heat energy absorbent surface, a second thin plate having a heat energy reflective surface, a thin insulating layer, said thin insulating layer having said first and second plates mounted in adjacency thereon with said absorbent and reflective surfaces exposed, a heat sink member, said heat sink member having said thin insulating layer mounted thereon with said absorbent and reflective surfaces exposed, whereby said first and second plates are in thermal contact with said heat sink member by way of the surfaces thereof opposite said absorbent and reflective surfaces and said thin insulting layer, sensor means adapted to measure a temperature difference between said first and second plates as a measure of the radiation flux incident on said plates, said sensor means comprising first and second thermocouple junctions attached to said first and second plates respectively, a third thermocouple junction located on said heat sink member, a fourth thermocouple junction, and means for maintaining said fourth thermocouple junction at a reference temperature, said third and fourth thermocouple junctions cooperating to measure the temperature of said heat sink member.

5. The apparatus of claim 4 further comprising a reflective casing enclosing said heat sink member except in the region of said thin insulating layer.

6. Apparatus for measurement of radiation flux within a heated chamber, said apparatus comprising a transducer having:

a first thin plate having a heat energy absorbent surface, a second thin plate having a heat energy reflective surface, a thin insulating layer, said thin insulating layer having said first and second plates mounted in adjacency thereon with said absorbent and reflective surfaces exposed, a heat sink member, said heat sink member comprising a first metal block and a second metal block, wherein said first metal block is smaller in size than said second metal block, said first metal block is secured to said second metal block, said first metal block having said thin insulating layer mounted thereon with said absorbent and reflective surfaces exposed, whereby said first and second plates are in thermal contact with said heat sink member by way of the surfaces thereof opposite said absorbent and reflective surfaces and said thin insulating layer, a reflective metal casing receiving said first and second metal blocks therein, an aperture in said casing exposing said absorbent and reflective surfaces, thermal insulating material within said casing around said second metal block, and sensor means adapted to measure a temperature difference between said first and second plates as a measure of the radiation flux incident on said plates, said sensor means comprising first and second thermocouple junctions attached to said first and second plates respectively.

7. Apparatus for measurement of radiation flux within a heated chamber, said apparatus comprising a transducer having:

a first thin plate having a heat energy absorbent surface, a second thin plate having a heat energy reflective surface, a thin insulating layer, said thin insulating layer having said first and second plates mounted in adjacency thereon with said absorbent and reflective surfaces exposed, a heat sink member, said heat sink member having said thin insulating layer mounted thereon with said absorbent and reflective surfaces exposed, whereby said first and second plates are in thermal contact with said heat sink member by way of the surfaces thereof opposite said absorbent and reflective surfaces and said thin insulting layer, a reflective casing enclosing said heat sink member except in the region of said thin insulating layer, and sensor means adapted to measure a temperature difference between said first and second plates as a measure of the radiation flux incident on said first and second plates, said sensor means comprising first and second sensor elements attached to said first and second plates respectively.

8. The apparatus of the claim 7 further comprising additional sensor means adapted to measure a temperature difference between said first plate and said heat sink member as a measure of total heat flux through said first plate, said additional sensor means comprising third and fourth sensor elements attached to said first plate and said heat sink member respectively.

9. The apparatus of claim 7 further comprising heat insulating material surrounding said heat sink member except in the region of said thin insulating layer.

10. The apparatus of claim 7 further comprising,
an output connector on said casing,
leads connecting said sensor elements to said connector, and
measurement display equipment, whereby said measured temperature difference can be remotely displayed on said display equipment by connection thereof to said transducer by way of said connector.

11. The apparatus of claim 7 further comprising additional sensor means for measuring temperature ambient to said casing, said further sensor means comprising a third sensor element mounted at the exterior of said casing, a fourth sensor element, and means for maintaining said fourth sensor element at a reference temperature.

12. The apparatus of claim 7 further comprising additional sensor means for measuring the temperature of said heat sink member, said additional sensor means comprising a third sensor element located on said heat sink member, a fourth sensor element and means for maintaining said fourth sensor element at a reference temperature.

13. The apparatus of claim 7 wherein said heat sink member comprises a first metal block having said thin insulating layer mounted to one face thereof and a second metal block having said first metal block secured thereto, said first metal block is smaller in size than said second metal block.

14. The apparatus of claim 13 further comprising thermal insulating material within said casing around said second metal block.

15. The apparatus of claim 7 further comprising a thin protective layer over said absorbent and reflective surfaces.

16. Apparatus for measurement of heat flux within a heated chamber, said apparatus comprising a transducer having:
a thin plate having a heat energy absorbent surface,
a thin insulating layer, said thin insulating layer having said plate mounted thereon with said absorbent surface exposed,
a heat sink member, said heat sink member having said thin insulating layer mounted thereon with said absorbent surface of said plate exposed,
whereby said plate is in thermal contact with said heat sink member by way of the surface thereof opposite said absorbent surface and said thin insulating layer, a reflective casing enclosing said heat sink member except in the region of said thin insulting layer, and sensor means adapted to measure a temperature difference between said plate and said heat sink member as a measure of heat flux at said absorbent surface, said sensor means comprising first and second sensor elements attached to said plate and said heat sink member respectively.

17. The apparatus of claim 16 wherein said casing comprises a rectangular aluminum casing exposing said absorbent plate surface at a major face thereof.

18. The apparatus of claim 16 further comprising first and second additional sensor means adapted to measure the temperature of said heat sink member and the ambient temperature adjacent said casing, said first additional sensor means comprising a third sensor element attached to said heat sink member, a fourth sensor element, and means for maintaining said fourth sensor element at a reference temperature, and said second additional sensor means comprising a fifth sensor element externally mounted on said casing, a sixth sensor element maintained at a reference temperature by said reference temperature maintaining means.

19. A method of measuring heat flux in a heated chamber comprising the steps of:
providing a transducer comprising a thin plate having a heat energy absorbent surface, a thin insulating layer having said plate mounted thereon with said absorbent surface exposed, a heat sink member having said thin insulating layer mounted thereon with said absorbent surface exposed, whereby said plate is in thermal contact with said heat sink member by way of the surface thereof opposite said absorbent surface and said thin insulating layer, a reflective casing enclosing said heat sink member except in the region of said thin insulting layer, and first and second sensor elements attached to said plate and said heat sink member respectively, placing said transducer in said heated chamber with said absorbent surface exposed, and effecting measurements of the temperature difference between said plate and said heat sink by means of said first and second sensor elements as a measure of the heat flux at said absorbent surface.

20. The method of claim 19 wherein said transducer has a second thin plate mounted on said insulating layer, said second thin plate having a heat reflective surface exposed adjacent said absorbent surface, and a third sensor element attached to said second plate, said method further comprising effecting measurements of the temperature difference between said first thin plate and said second thin plate by means of said first and third sensor elements as a measure of radiation flux within said chamber.

21. A method of measuring radiation flux in a heated chamber, the method comprising the steps of:
providing a transducer having a first thin plate having a heat energy absorbent surface, a second thin plate having a heat energy reflective surface, a thin insulating layer having said first and second plates mounted in adjacency thereon with said absorbent and reflective surfaces exposed, a heat sink member having said thin insulating layer mounted thereon with said absorbent and reflective surfaces exposed, whereby said first and second plates are in thermal contact with said heat sink member by way of the surfaces thereof opposite said absorbent and reflective surfaces and said thin insulating layer, a reflective casing enclosing said heat sink member except in the region of said thin insulating layer, and first and second sensor elements attached to said first and second plates respectively, placing said transducer with said transducer located to expose said adjacent surfaces, and effecting measurements of the temperature difference between said first and second thin plates by means of said first and second sensor elements as a measure of the radiation flux within said chamber.

* * * * *